United States Patent [19]
Gray

[11] 3,729,637
[45] Apr. 24, 1973

[54] COMBINED BATTERY CHARGER AND AUTOMATIC IGNITION BOOSTER

[75] Inventor: Richard G. Gray, Long Island, N.Y.

[73] Assignee: Magnetic Head Corporation, Hauppauge, N.Y.

[22] Filed: May 5, 1971

[21] Appl. No.: 140,464

[52] U.S. Cl..................307/10 BP, 307/66, 320/56
[51] Int. Cl. ..............................................H02g 3/00
[58] Field of Search....................320/31, 33, 34, 56, 320/2; 307/66, 64, 10 BP, 10 R

[56] References Cited

UNITED STATES PATENTS

| | | | |
|---|---|---|---|
| 3,315,474 | 4/1967 | Farer | 307/66 |
| 3,270,267 | 8/1966 | Nolte, Jr. | 320/56 |
| 3,174,048 | 3/1965 | Snyder et al | 307/10 |

*Primary Examiner*—Herman J. Hohauser
*Attorney*—Colton & Stone

[57] ABSTRACT

An accessory circuit arrangement for an internal combustion engine employing a D.C. battery source for the starter and ignition circuits which permits the alternate utilization of the same external A.C. source as a battery charger and an ignition booster.

5 Claims, 1 Drawing Figure

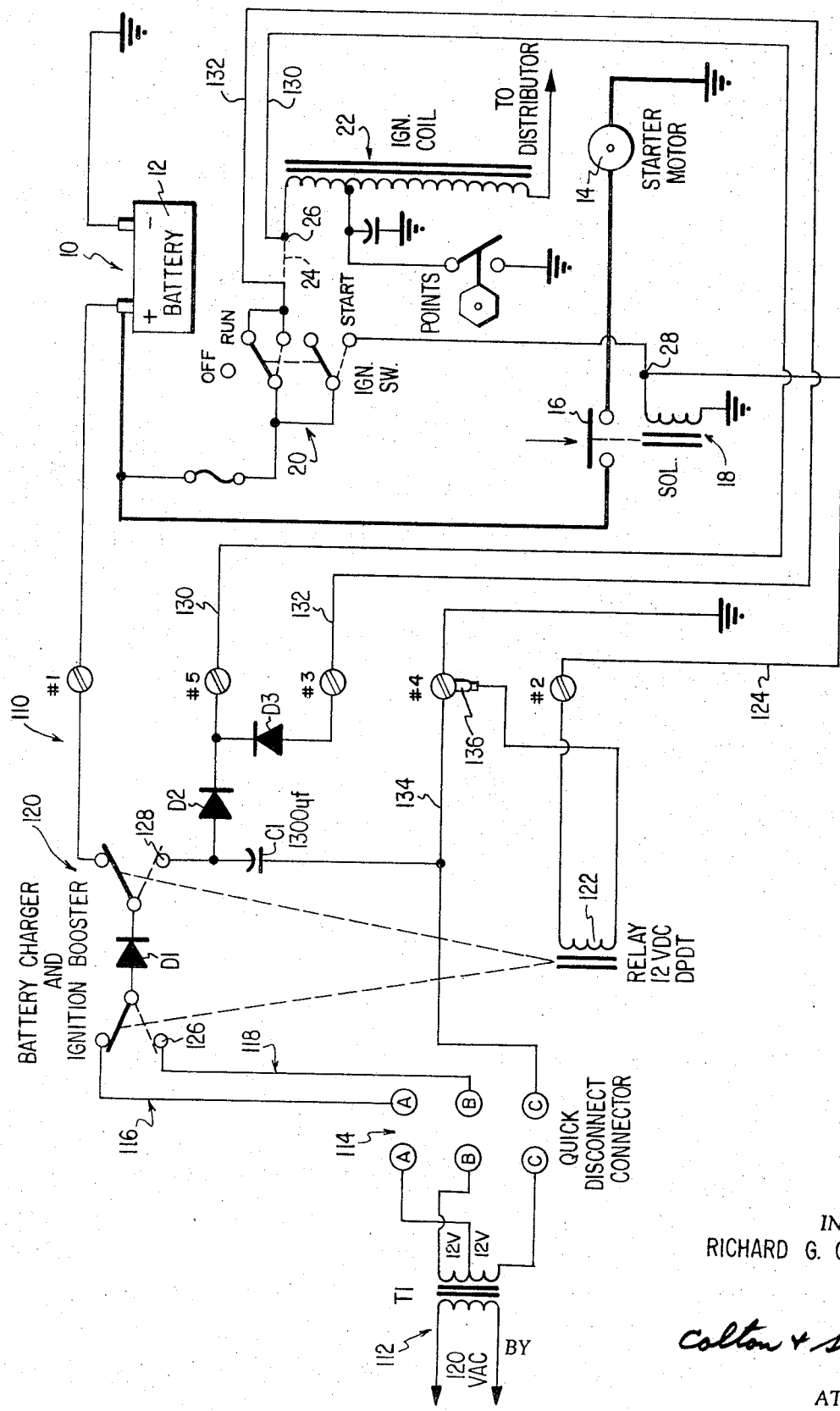

COMBINED BATTERY CHARGER AND AUTOMATIC IGNITION BOOSTER

BACKGROUND OF THE INVENTION

The self-starting, internal combustion engine has, since its inception, been dependent upon a separate source of electrical potential, such as a battery, for starting.

In the case of automotive vehicles, the usual D.C. battery not only activates the starter motor but, also, is called upon to supply starting power for the ignition circuit. The relatively large current drain represented by the starter motor produces a decreased voltage drop across the battery terminals, which may be on the order of several volts, so that less than normal rated power is available to the ignition circuit. The problem may, of course, be compounded by a variety of adverse starting conditions such as a low battery charge, an improperly tuned engine, faulty wiring and the most common cause of battery drain; cold weather starting. All of the foregoing as well as the continuing demand for additional electrical appliances, and particularly air conditioners, contribute to shortened battery life and the very considerably annoyance experienced by virtually all drivers; the inability to start a car in cold weather.

As a practical matter, the only commercially attempted solutions to these problems have involved the development of longer life batteries and their recharge or replacement at various intervals during the lifetime of a car. Inasmuch as the usual commercial method of recharging a battery involves its removal from a car, many drivers tend to simply replace a battery rather than undergo the inconvenience of obtaining successive battery charges which are required with increasing frequency as the battery ages.

In recognition of the foregoing, various schemes have been proposed to reduce battery drain during starting and provide full power to the ignition circuit. These prior proposals, as exemplified by the disclosures in U. S. Pat. Nos. 2,692,953; 2,883,560 and 3,340,402, involved the concept of an auxiliary battery and have never enjoyed commercial acceptance for reasons which may well include cost and space considerations for mounting the same. In any event such systems, at best, can act only to decrease battery drain as opposed to recharging the battery.

Similarly, it has been previously suggested that a rectified A.C. source be used to charge a car battery without removal of the same from the vehicle as in U.S. Pats. Nos. 3,174,048 and 3,270,267. These latter schemes, while extending battery life to some extent by facilitating the manner of recharging, do not attack the root cause of excessive battery drain during starting which, simply stated, is the necessity for the battery to supply power to both the starter motor and ignition circuit.

An analogous approach in the field of small battery operated applicances is disclosed in U.S. Pats. Nos. 3,089,071 and 3,316,417 wherein the same external A.C. source may be used to recharge a battery or provide an alternative source of potential for a motor normally driven by the battery. The circuit arrangements in these latter patent disclosures are not only unduly complex but contain no provision for the booster circuit concept which, in the case of an internal combustion engine, requires that the battery be maintained in circuit with the ignition circuit. Furthermore, it is essential that the recharge and boost circuits be connected in parallel and include means responsive to an engine starting sequence to deenergize the recharge circuit and energize the boost circuit.

SUMMARY OF THE INVENTION

The invention, in its broader aspect, is directed to a concept; that of using a single disconnectible A.C. source for charging an automobile battery over an extended period of time and boosting the ignition circuit during starting. The advantages are obvious. THe battery may be charged to full potential at desired intervals from a conventional household A.C. outlet and the ignition circuit automatically boosted during the starting which not only assures faster starting under virtually all conditions but also decreases total battery power consumption to thereby contribute to longer battery life independently of the longer life imparted thereto by frequent recharging.

The simplicity of the accessory circuit and its adaptability for installation directly into a standard ignition circuit by the simple expedient of reconnecting one conductor and adding three more are outstanding features of the invention.

The accessory circuit includes a quick disconnect connector which may, conveniently be plugged into any household outlet, such as in a garage for example, to charge the battery so long as the ignition switch is off and the accessory circuit is plugged into the A.C. outlet. Upon starting, rectified current is automatically shunted from the battery charge circuit to a parallel boost circuit.

DESCRIPTION OF THE DRAWING

The manner in which the foregoing advantages are achieved will become more apparent from the ensuing detailed description when considered in conjunction with the appended drawing which illustrates the accessory battery charger and ignition booster circuit interconnected with a conventional automobile ignition system.

DESCRIPTION OF THE PREFERRED EMBODIMENT

An accessory battery charger and ignition booster circuit 110 is diagramatically illustrated in the drawing in circuit combination with a conventional automotive starter and ignition circuit 10. The use of two digit reference characters to denote the components of the conventional circuit will facilitate the distinction with respect to the accessory circuit to which three digit reference characters are applied.

The conventional circuit 10 functions in the usual manner to supply starting current from battery 12 to starter motor 14 through normally open switch 16 which is closed by the energization of starter solenoid 18 as the same is energized through the lower of the ganged ignition switch pair 20 when moved to the start position. Simultaneously, current is supplied from battery 12 to the primary of ignition coil 22 through the upper of the ignition switch pair via conductor 24 and the positive terminal 26 of ignition coil 22. Even if battery 12 is fully charged, the drain represented by the starter motor decreases the power that can be supplied to the ignition circuit.

The battery may, however, be kept fully charged and the ignition circuit booster from a conventional 120 V. source 112 when the accessory circuit 110 is interconnected therewith through a step down transformer T1 and a quick disconnect connector 114. The accessory circuit includes parallel charge and booster circuits 116, 118 whose alternate energization is controlled by a double pole, double throw relay operated switch 120 whose coil 122 is parallel connected with the starter solenoid 18.

A diode D1, in relay switch 12, rectifies A.C. to D.C. current for charging battery 12 in the solid line circuit configuration shown in the drawing. When the ignition switch is moved to the "start" position, the starter solenoid is activated and, simultaneously, the coil 122 of relay 120 is energized to bridge terminals 126, 128 in the boost circuit and open the charge circuit. This is the dotted line circuit configuration shown in the drawing. The rectified A.C. current now passes through a diode D2 to supply booster ignition coil current through conductor 130 and the ignition coil terminal 26. It will be appreciated that diode D2 provides an electrical block between the auxiliary and ignition circuits to the extent that the conventional ignition circuit is unaffected by the relatively large capacitor C1 which is connected between terminal 128 and ground via conductor 134. The C1 function is to boost the half wave rectified voltage. A diode D3 insures that booster flow is along conductor 130 and that while the engine is being started, current is precluded from flowing into the battery 12 via conductor 132 and switch 20.

The connection from relay coil 122 to ground is via a disconnectible lug 136 secured to the No. 4 panel terminal. Each of the panel terminals No. 1, No. 2, No. 3, No. 4 and No. 5 are a part of a modular package which is attached to the automobile after which time the remaining circuit connections to the conventional ignition circuit are completed, as shown.

It is an important feature of the invention that only a single disruption of the original ignition circuit is required to install the accessory circuit. Thus, the only required alteration in the original circuit is to disconnect conductor 24 from the ignition coil terminal 26 and reconnect the same to the panel terminal No. 3 which connection into the accessory circuit is designated by the reference character 132. A separate conductor 130 is then interconnected between the ignition coil terminal 26 and panel terminal No. 5.

In operation, and assuming a suitable outlet and step down transformer to be positioned adjacent a desired parking space as in a garage, the automobile is parked and the connector plugged into the outlet. The circuit condition is, initially, as shown in solid lines and rectified current is supplied to the battery for charging. When the ignition switch is moved to the start position, as indicated in dotted lines, relay 120 is energized via conductor 124 to disconnect the charge circuit and energize the boost circuit as indicated by the dotted line position of relay 120.

I claim:

1. In combination with starter and ignition circuits including a battery and a starter motor, the improvement comprising; circuit means for supplying rectified A. C. current selectively to said battery or said ignition circuit including means operative as a function of the energization of said starter circuit for ceasing supply of said A. C. current to said battery and for supply rectified A. C. current to said ingition circuit and connector means adapted for connection to an external A. C. source.

2. In combination with starter and ignition circuits including a battery and a starter motor, the improvement comprising; circuit means for selectively supplying rectified A.C. current to said battery and said ignition circuit; said circuit means including connector means adapted for connection to an external A.C. source; and said circuit means including parallel branch circuits respectively interconnecting said connector means with said battery and said ignition circuit.

3. The combination of claim 2 including relay switching means for controlling the selective supply of rectified A.C. current to said battery and said ignition circuit.

4. The combination of claim 3 wherein said starter motor circuit includes a normally open solenoid operated switch, said ignition circuit including a manually operated ignition switch for selectively supplying battery power to said ignition circuit and the coil of said solenoid operated switch; and said circuit means including a third branch circuit for energizing said relay switching means concomitantly with the energization of the coil of said solenoid operated switch.

5. An accessory circuit arrangement for the selective supply of rectified A.C. current to a battery and an ignition circuit, comprising; a plurality of connector terminals adapted for connection to a battery, an ignition circuit, and ground; a connector adapted to be plugged into a A.C. source; parallel branch circuits interconnecting said connector with at least two of said terminals; switch means for making and breaking said parallel branch circuits; means in circuit with at least one other of said terminals for actuating said switch means; and means associated with said branch circuits for supplying rectified A.C. current to said at least two terminals for the selective supply of the same to a battery and an ignition circuit.

* * * * *